United States Patent
Wu et al.

(10) Patent No.: US 7,523,820 B1
(45) Date of Patent: Apr. 28, 2009

(54) ROLLING ELEMENT CHAIN

(75) Inventors: Ching-Shan Wu, Taichung Hsien (TW); Yen-I Liao, Taichung Hsien (TW); Chien-Hsiung Liao, Taichung Hsien (TW)

(73) Assignee: Precision Motion Industries, Inc. (TW)

( * ) Notice: Subject to any disclaimer, the term of this patent is extended or adjusted under 35 U.S.C. 154(b) by 0 days.

(21) Appl. No.: 12/035,540

(22) Filed: Feb. 22, 2008

(51) Int. Cl.
*B65G 17/24* (2006.01)

(52) U.S. Cl. ..................... 198/779; 198/850

(58) Field of Classification Search ............. 198/779, 198/850, 851, 853
See application file for complete search history.

(56) References Cited

U.S. PATENT DOCUMENTS

| | | | | |
|---|---|---|---|---|
| 4,718,543 A | * | 1/1988 | Leisner et al. | 198/779 |
| 5,311,982 A | * | 5/1994 | Clopton | 198/779 |
| 5,344,001 A | * | 9/1994 | Kawaai et al. | 198/779 |
| 6,896,122 B2 | * | 5/2005 | Gambrell et al. | 198/779 |

FOREIGN PATENT DOCUMENTS

JP        6-144534    *    5/1994

* cited by examiner

*Primary Examiner*—James R Bidwell
(74) *Attorney, Agent, or Firm*—Hershkovitz & Associates, LLC; Abraham Hershkovitz

(57) ABSTRACT

A rolling element chain is applied to retain and arrange multiple rollers at intervals in a line and has a belt assembly and multiple clamping assemblies. The rollers are cylinders mounted parallelly in the rolling element chain. The belt assembly is resilient and has two parallel bars. The clamping assemblies are formed in pairs between the parallel bars to form multiple roller holes on the belt assembly and each clamping assembly has multiple clamping protrusions. The clamping protrusions of each clamping assembly are formed in a line between the parallel bars and alternately protrude oppositely away from the belt assembly and together hold one corresponding roller in the belt assembly. Each clamping protrusion has a roller surface and at least one apex. The at least one apex is formed on and protrudes from the roller surface, thereby, reduces contact area between the clamping protrusions and the rollers.

16 Claims, 8 Drawing Sheets

ROLLING ELEMENT CHAIN

BACKGROUND OF THE INVENTION

1. Field of Invention

The present invention relates to a rolling element chain with reduced internal resistance, thereby, raising life span and efficiency thereof.

2. Description of the Related Art

A rolling element chain is used to keep multiple rolling elements such as cylindrical rollers away from each other. Some rolling element chains further retain lubricant to lubricate and prolong life span of the rolling elements.

With reference to FIGS. 7 and 8, a conventional rolling element chain (40) is applied to retain and arrange multiple rollers (90) and comprises two parallel bars (41), multiple receiving holes (43) and multiple retaining elements (42).

The rollers (90) are disposed parallelly in a column and each has an annular surface and two ends. The bars (41) respectively connect the ends of the rollers (90) and are parallel to each other. The receiving holes (43) are formed between the bars (41), align with each other and each has two retaining sides. The retaining elements (42) are mounted respectively in the receiving holes (43) near the retaining sides and each retaining element (42) has multiple retaining surfaces (421, 422, 423) adjacent to each other.

The retaining surfaces (421, 422, 423) of the adjacent retaining elements (42) abut the annular surface of a corresponding roller (90). The bars (41) also abut the ends of each roller (90). This contact is principally surface-to-surface contact. Therefore, much friction is generated, negatively influencing rolling movement of the rollers (90) and requiring lubrication between the rollers (90) and the bars (41) for efficient function and life span.

To overcome the shortcomings, the present invention provides a rolling element chain to mitigate or obviate the aforementioned problems.

SUMMARY OF THE INVENTION

The primary objective of the present invention is to provide a rolling element chain that mounts multiple rolling elements and has reduced contact area with the rolling elements.

The rolling element chain is applied to retain and arrange multiple rollers at intervals in a line and has a belt assembly and multiple clamping assemblies. The rollers are cylinders mounted parallelly in the rolling element chain. The belt assembly is resilient and has two parallel bars. The clamping assemblies are formed in pairs between the parallel bars to form multiple roller holes on the belt assembly and each clamping assembly has multiple clamping protrusions. The clamping protrusions of each clamping assembly are formed in a line between the parallel bars and alternately protrude oppositely away from the belt assembly and together hold one corresponding roller in the belt assembly. Each clamping protrusion has a roller surface and at least one apex. The at least one apex is formed on and protrudes from the roller surface, thereby, reduces contact area between the clamping protrusions and the rollers.

Other objectives, advantages and novel features of the invention will become more apparent from the following detailed description when taken in conjunction with the accompanying drawings.

DETAILED DESCRIPTION OF THE INVENTION

Figure 1:
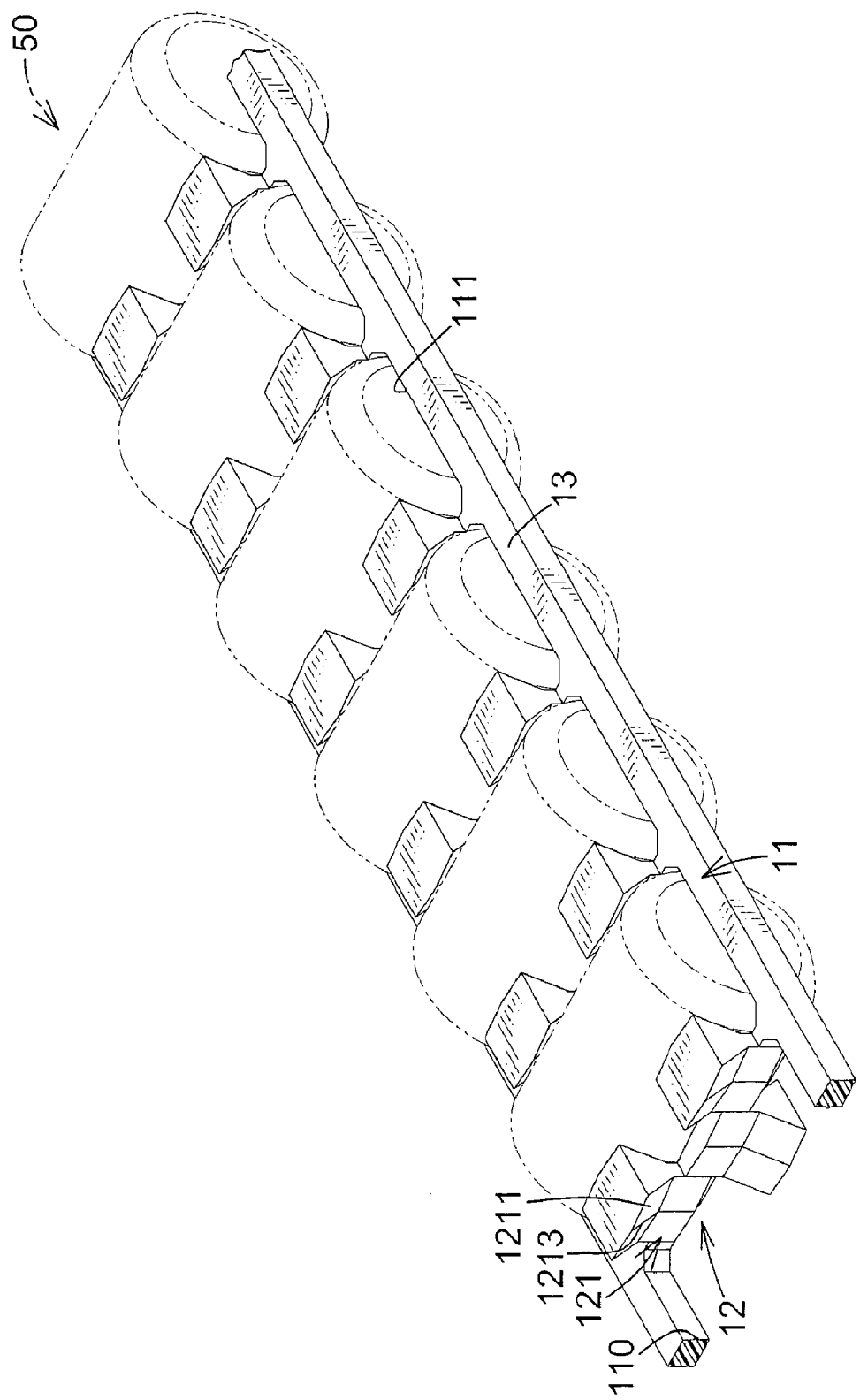
FIG. 1 is an enlarged cross-sectional perspective view of a first embodiment of a rolling element chain in accordance with the present invention, shown with a first roller removed.
Figure 4:
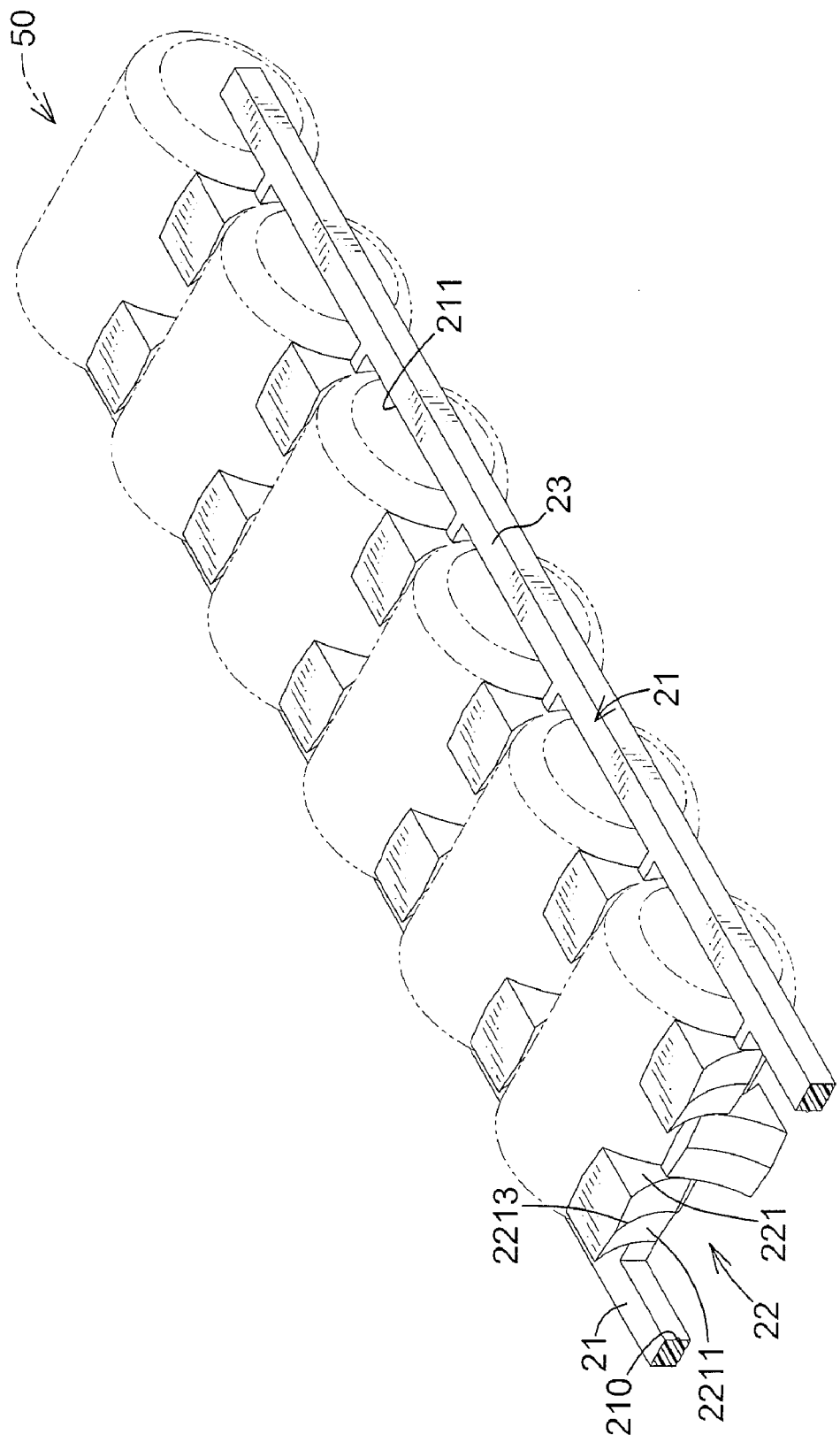
FIG. 4 is an enlarged cross-sectional perspective view of a second embodiment of a rolling element chain in accordance with the present invention, shown with a first roller removed.
Figure 6:
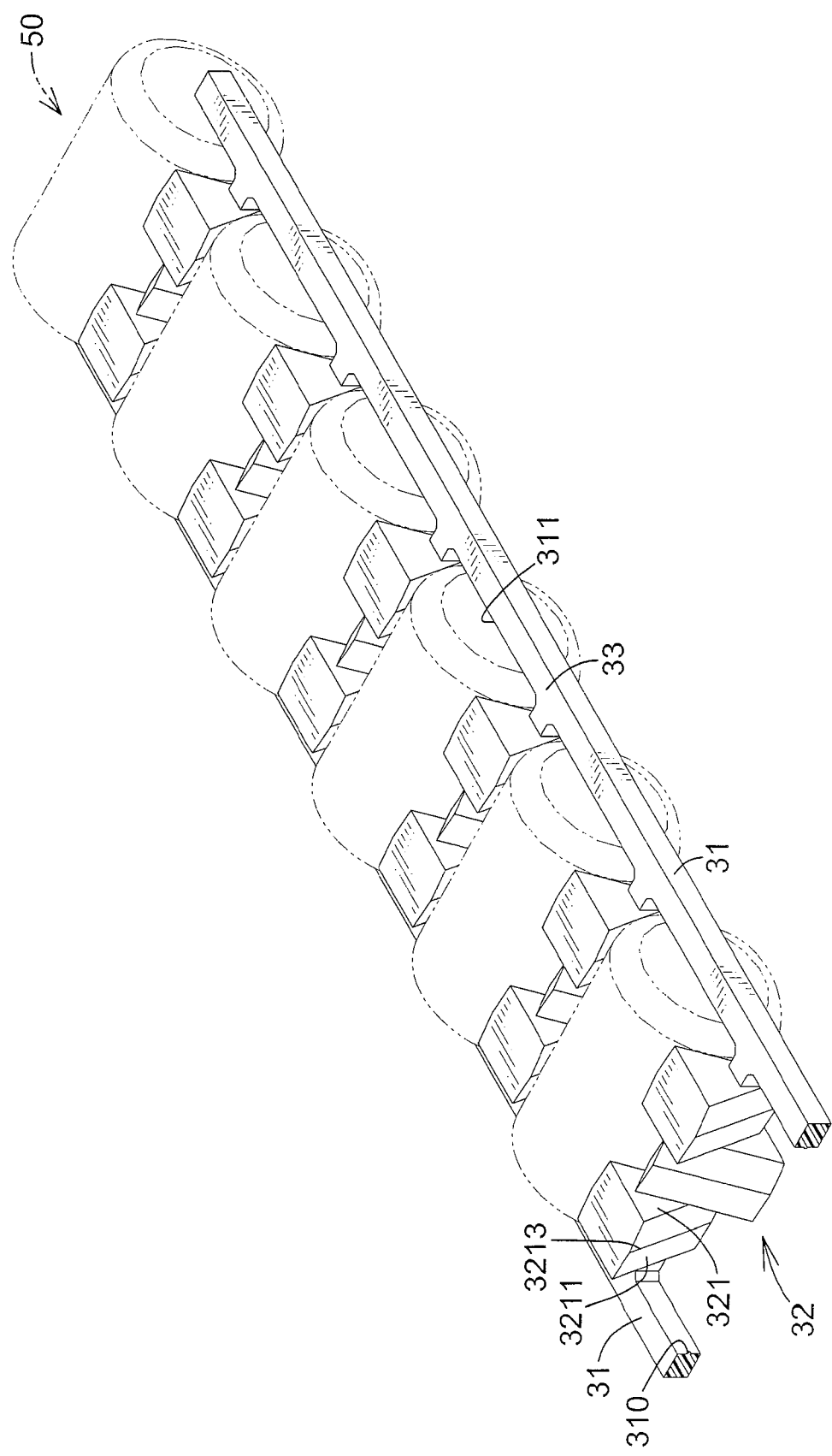
FIG. 6 is an enlarged cross-sectional perspective view of a third embodiment of a rolling element chain in accordance with the present invention, shown with a first roller removed.
Figure 7:
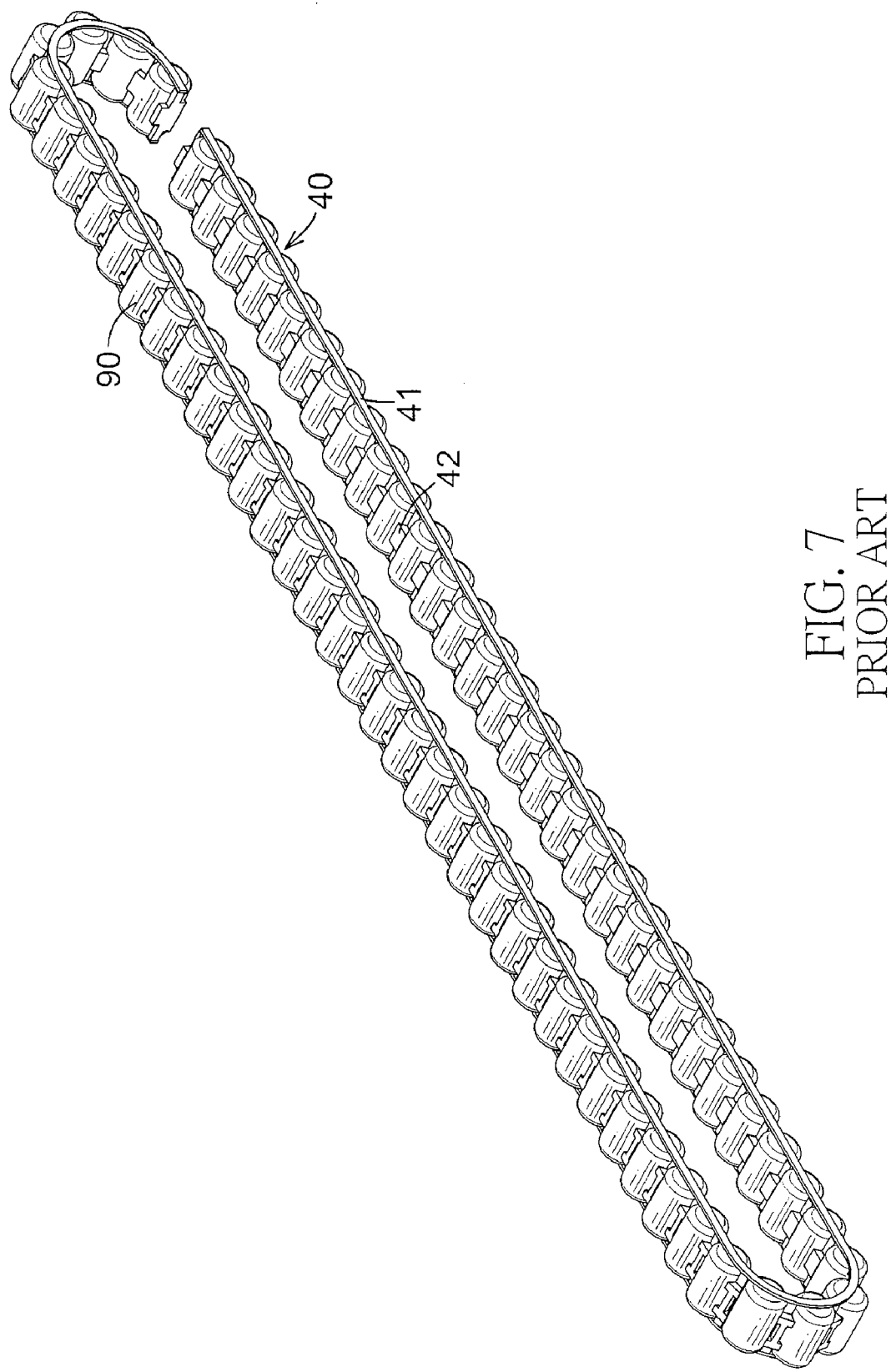
FIG. 7 is a perspective view of a conventional rolling element chain in accordance with the present invention.
Figure 8:
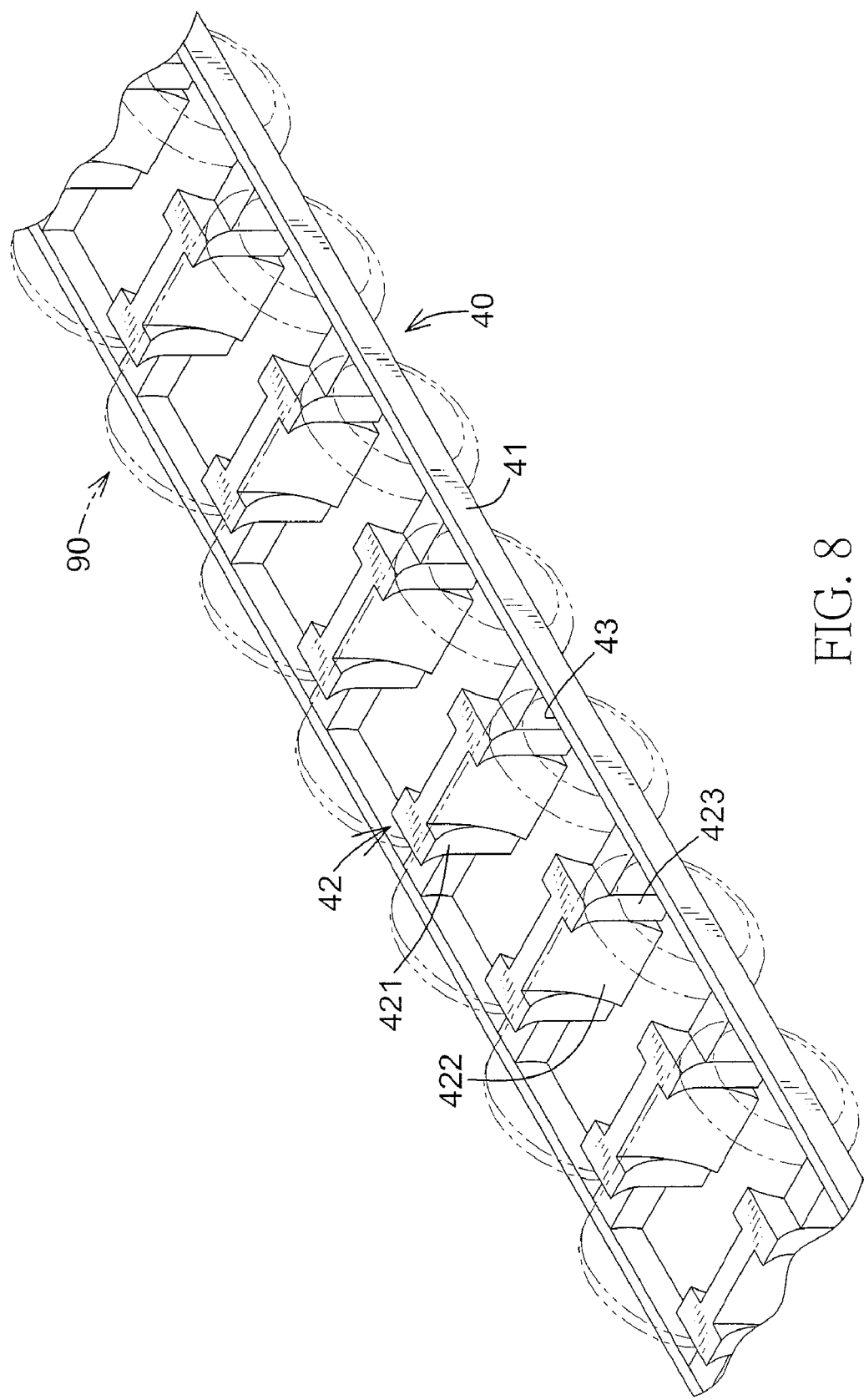
FIG. 8 is an enlarged perspective view of the conventional rolling element chain in FIG. 7, with rollers shown in phantom lines.

With reference to FIGS. 1, 4 and 6, a rolling element chain in accordance with the present invention is applied to retain and arrange multiple rollers (50) at intervals in a column and comprises a belt assembly (11, 21, 31) and multiple clamping assemblies (12, 22, 32).

The rollers (50) are cylinders mounted parallelly in the rolling element chain. Each cylinder has two ends and an annular surface.

The belt assembly (11, 21, 31) is resilient and has two parallel bars (13, 23, 33). The parallel bars (13, 23, 33) of the belt assembly (11, 21, 31) are adjacent to the ends of the rollers (50) and each parallel bar (13, 23, 33) has an inner side, multiple supporting surfaces, two rolling surfaces and multiple bosses (110, 210, 310).

The supporting surfaces of the parallel bar (13, 23, 33) are formed continually on and along the inner side of the parallel bar (13, 23, 33). Each supporting surface of one parallel bar (13, 23, 33) corresponds to one supporting surface of the other parallel bar (13, 23, 33) and has two ends.

The rolling surfaces of each parallel bar (13, 23, 33) are opposite to one another and are perpendicular to the inner side of the parallel bar (13, 23, 33).

The bosses (110, 210, 310) are respectively formed centrally on and protrude from the supporting surfaces of the parallel bar (13, 23, 33), respectively correspond to and abut a center of each end of the rollers (50), thereby reduce contact area between the belt assembly (11, 21, 31) and the rollers (50).

The clamping assemblies (12, 22, 32) are formed between the parallel bars (13, 23, 33) to form multiple roller holes (111, 211, 311) on the belt assembly (11, 21, 31) and are adjacent to the annular surface of one roller (50) to hold the roller (50). Two adjacent clamping assemblies (12, 22, 32) are formed respectively between the ends of the corresponding supporting surfaces of the parallel bars (13, 23, 33) and may be formed as a single piece. Each clamping assembly (12, 22, 32) has multiple clamping protrusions (121, 221, 321). Preferably each clamping assembly (12, 22, 32) has three clamping protrusions (121, 221, 321).

The clamping protrusions (121, 221, 321) of each clamping assembly (12, 22, 32) are formed in a line between the parallel bars (13, 23, 33) and alternately protrude oppositely away from the rolling surfaces of the belt assembly (11, 21, 31) and together hold the roller (50) in the belt assembly (11, 21, 31). Each clamping protrusion (121, 221, 321) has a proximal end, a distal end, a roller surface and at least one apex (1213, 2213, 3213).

The proximal end of the clamping protrusion (121, 221, 321) is formed adjacent to the proximal end of each adjacent clamping protrusion (121, 221, 321).

The distal end of each clamping protrusion (121, 221, 321) is larger than the proximal end and alternately protrudes oppositely from the proximal end of the clamping protrusion (121, 221, 321).

The roller surface (1211, 2211, 3211) of each clamping protrusion (121, 221, 321) may be curved, may be straight and may be formed as two beveled straight surfaces. When the roller surface (3211) of each clamping protrusion (321) is straight, a triangular protrusion (323) is formed on the proximal end of each clamping protrusion (321), protrudes from the proximal end opposite to the distal end and has an assistant surface. The assistant surface of each triangular protrusion corresponds to and aligns with the roller surface (3211) of the corresponding clamping protrusion (321).

Figure 2:
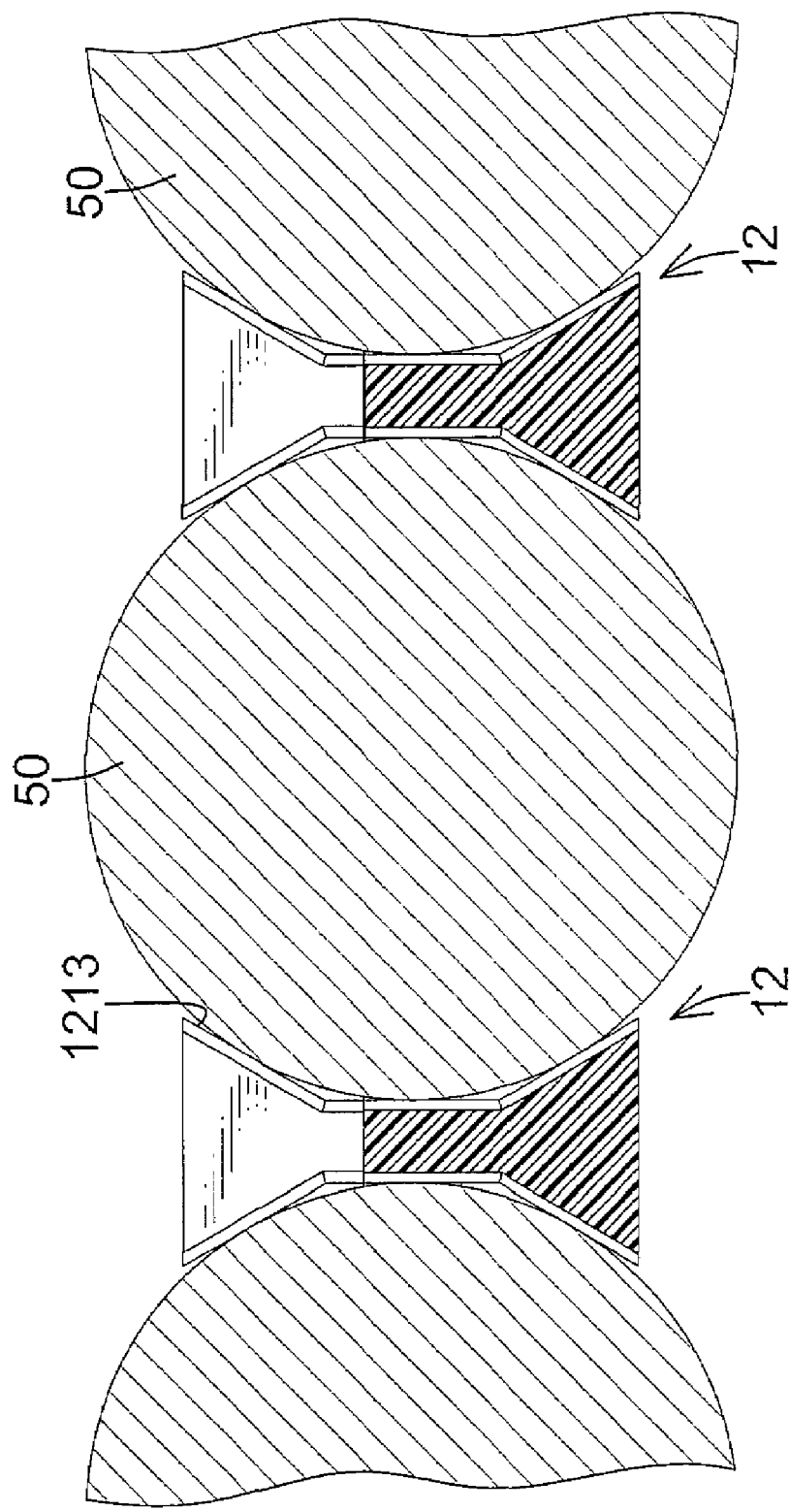
FIG. 2 is an enlarged cross-sectional side view of the rolling element chain in FIG. 1.
Figure 3:
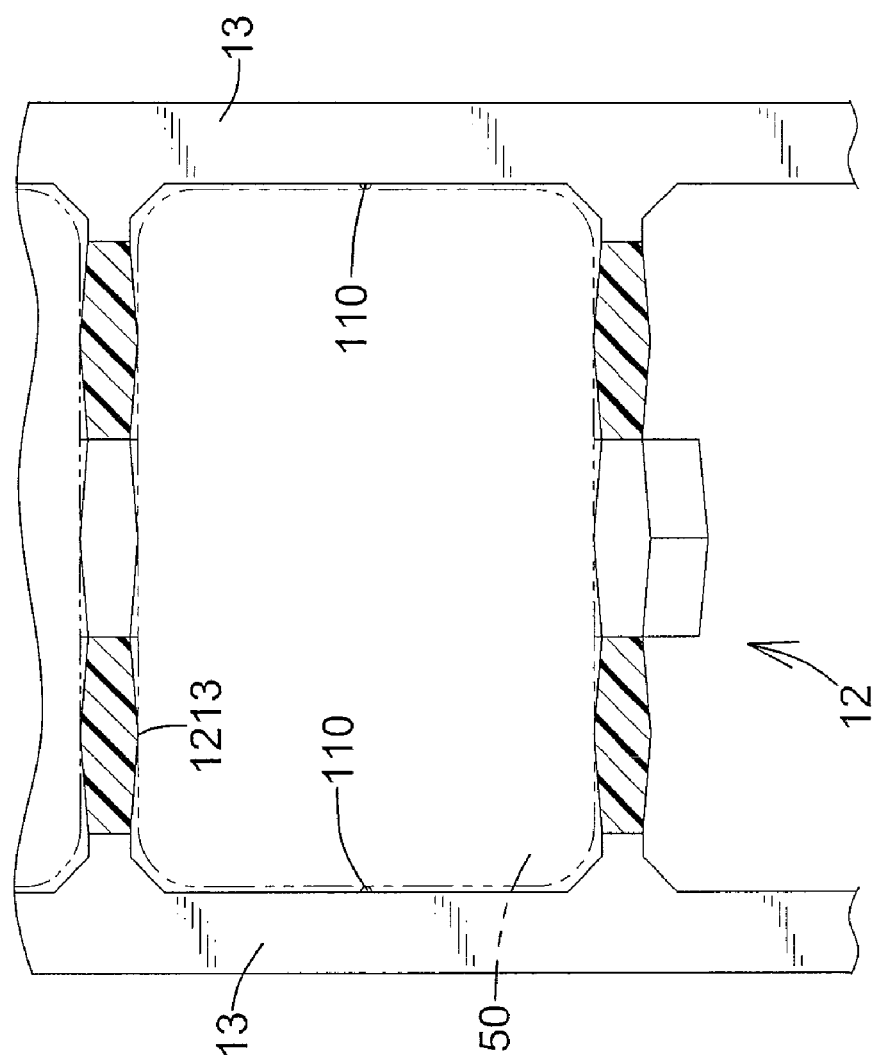
FIG. 3 is an enlarged top view in partial section of the rolling element chain in FIG. 1, the roller shown in phantom lines.
Figure 5:
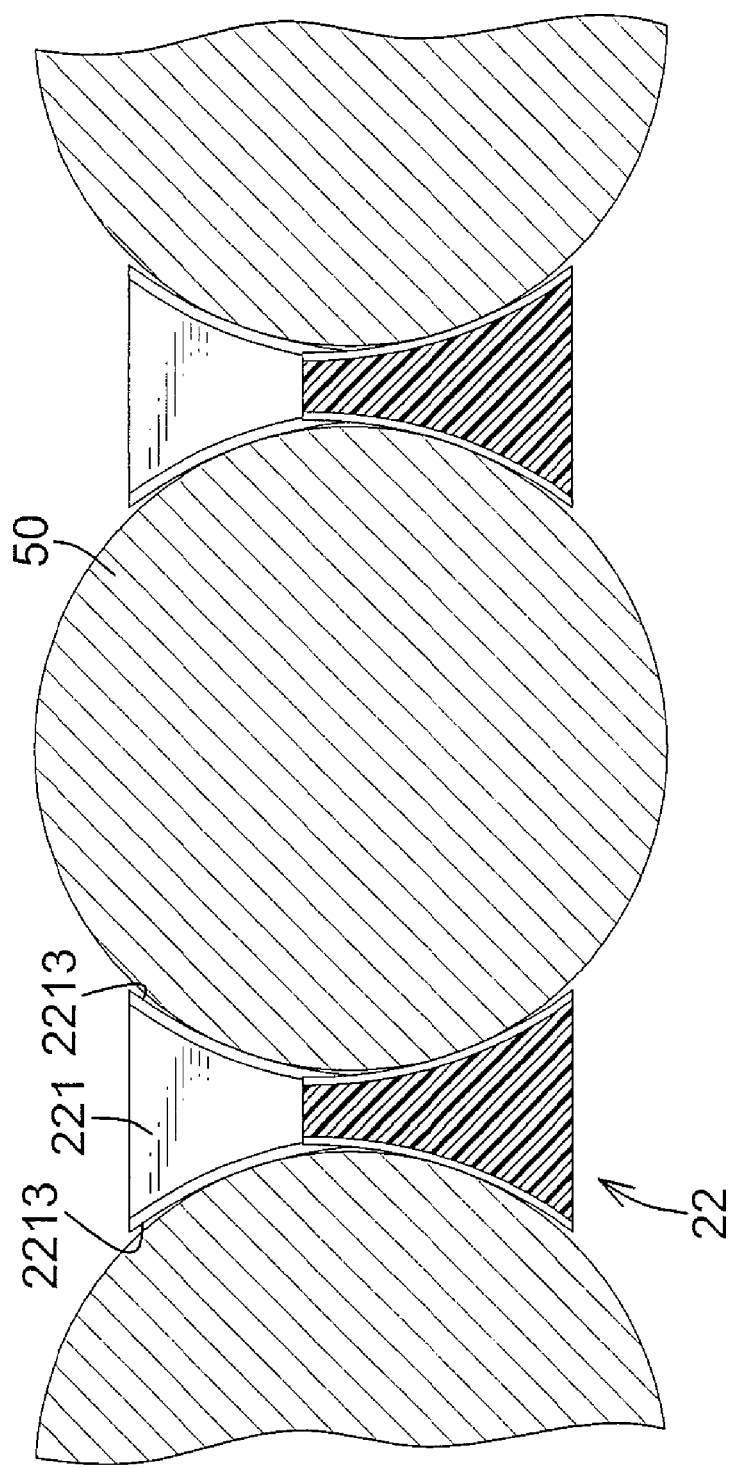
FIG. 5 is an enlarged cross-sectional side view of the rolling element chain in FIG. 4.

With further reference to FIGS. 2, 3 and 5, each of the at least one apex (1213, 2213, 3213) is formed on the roller surface of the clamping protrusion (121, 221, 321) from the proximal to the distal end, is formed by protruding two adjacent inclined surfaces from the roller surface of the clamping protrusion (121, 221, 321), may not precisely correspond to the annular wall of each roller (50), thereby, reduces contact area between the clamping protrusions (121, 221, 321) and the rollers (50). The at least one apex (2213) of each clamping protrusion (221) may be further formed on the assistant surface of the corresponding triangular protrusion. Moreover, a total amount of the at least one apex (1213, 2213, 3213) on each clamping protrusion may be one, and therein the apex (1213, 2213, 3213) may be formed centrally on the roller surface (1211, 2211, 3211).

Consequently, reducing contact area between the belt assembly (11, 21, 31) and the rollers (50) enhances ease of movement of the rollers (50), requires less lubricant and increases life span of the rolling element chain.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A rolling element chain comprising
    a belt assembly being resilient and having two parallel bars, and each parallel bar having
        an inner side;
        multiple supporting surfaces being formed continually on and along the inner side of the parallel bar, and each supporting surface of one parallel bar corresponding to one supporting surface of the other parallel bar and having two ends; and
        two rolling surfaces being opposite to one another and being perpendicular to the inner side of the parallel bar; and
    multiple clamping assemblies being formed between the parallel bars to form multiple roller holes on the belt assembly, wherein two adjacent clamping assemblies being formed respectively between the ends of corresponding supporting surfaces of the parallel bars, and each clamping assembly having
        multiple clamping protrusions being formed in a line between the parallel bars and alternately protruding oppositely away from the rolling surfaces of the belt assembly, and each clamping protrusion having
            a proximal end, wherein the proximal ends of adjacent clamping protrusions are adjacent to each other;
            a distal end being larger than the proximal end of the clamping protrusion, wherein the distal ends of the adjacent clamping protrusions protrude oppositely;
            a roller surface; and
            at least one apex, and each of the at least one apex being formed on the roller surface of the clamping protrusion from the proximal to the distal end and being formed by protruding two adjacent inclined surfaces from the roller surface of the clamping protrusion.

2. The rolling element chain as claimed in claim 1, wherein each clamping assembly has three clamping protrusions.

3. The rolling element chain as claimed in claim 2 wherein each clamping protrusion has one apex formed centrally on the roller surface.

4. The rolling element chain as claimed in claim 3, wherein each parallel bar further has multiple bosses being respectively formed centrally on and protrude from the supporting surfaces of the parallel bar.

5. The rolling element chain as claimed in claim 1, wherein the roller surface of each clamping protrusion is curved.

6. The rolling element chain as claimed in claim 2, wherein the roller surface of each clamping protrusion is curved.

7. The rolling element chain as claimed in claim 3, wherein the roller surface of each clamping protrusion is curved.

8. The rolling element chain as claimed in claim 4, wherein the roller surface of each clamping protrusion is curved.

9. The rolling element chain as claimed in claim 1, wherein
    the roller surface of each clamping protrusion is straight;
    each clamping protrusion has a triangular protrusion being formed on the proximal end of the clamping protrusion, protruding from the proximal end opposite to the distal end and having an assistant surface corresponding to and aligning with the roller surface of the clamping protrusion; and
    the at least one apex of each clamping protrusion is further formed on the assistant surface of a corresponding triangular protrusion.

10. The rolling element chain as claimed in claim 2, wherein
    the roller surface of each clamping protrusion is straight;
    each clamping protrusion has a triangular protrusion being formed on the proximal end of the clamping protrusion, protruding from the proximal end opposite to the distal end and having an assistant surface corresponding to and aligning with the roller surface of the clamping protrusion; and
    the at least one apex of each clamping protrusion is further formed on the assistant surface of a corresponding triangular protrusion.

11. The rolling element chain as claimed in claim 3, wherein the roller surface of each clamping protrusion is straight;

each clamping protrusion has a triangular protrusion being formed on the proximal end of the clamping protrusion, protruding from the proximal end opposite to the distal end and having an assistant surface corresponding to and aligning with the roller surface of the clamping protrusion; and the apex of each clamping protrusion is further formed on the assistant surface of a corresponding triangular protrusion.

12. The rolling element chain as claimed in claim 4, wherein the roller surface of each clamping protrusion is straight;

each clamping protrusion has a triangular protrusion being formed on the proximal end of the clamping protrusion, protruding from the proximal end opposite to the distal end and having an assistant surface corresponding to and aligning with the roller surface of the clamping protrusion; and the apex of each clamping protrusion is further formed on the assistant surface of a corresponding triangular protrusion.

13. The rolling element chain as claimed in claim 1, wherein the roller surface of each clamping protrusion is formed as two beveled straight surfaces.

14. The rolling element chain as claimed in claim 2, wherein the roller surface of each clamping protrusion is formed as two beveled straight surfaces.

15. The rolling element chain as claimed in claim 3, wherein the roller surface of each clamping protrusion is formed as two beveled straight surfaces.

16. The rolling element chain as claimed in claim 4, wherein the roller surface of each clamping protrusion is formed as two beveled straight surfaces.

* * * * *